United States Patent [19]

Ward

[11] 4,161,839

[45] Jul. 24, 1979

[54] SWIVEL DEVICE FOR SUPPORTING A BALANCED OR SEMI-BALANCED FISHING ROD AND INDICATING WHEN A FISH STRIKES

[76] Inventor: Russell L. Ward, 1258 Esser Ave., San Leandro, Calif. 94579

[21] Appl. No.: 879,615

[22] Filed: Feb. 21, 1978

[51] Int. Cl.² .......................................... A01K 97/12
[52] U.S. Cl. ...................................... 43/17; 43/21.2; 248/515
[58] Field of Search ................. 43/17, 19.2, 21.2, 23, 43/25; 248/183, 514, 515, 530, 534, 532, 533

[56] References Cited

U.S. PATENT DOCUMENTS

| | | | |
|---|---|---|---|
| 2,840,330 | 6/1958 | Minton | 248/515 |
| 3,246,865 | 4/1966 | Latimer | 43/21.2 X |
| 3,484,066 | 12/1969 | Aunspaugh | 43/21.2 X |
| 3,906,653 | 9/1975 | Williams | 43/21.2 |
| 3,927,487 | 12/1975 | Miyamae | 43/21.2 |

Primary Examiner—Nicholas P. Godici
Assistant Examiner—Robert P. Olszewski
Attorney, Agent, or Firm—William R. Piper

[57] ABSTRACT

A swivel device for supporting a fishing rod in which the rod is pivotally supported at its center or near center of gravity and the rod is free to swing about horizontal and vertical axes when a fish strikes at the bait and starts to swim away thereby causing the rod to swing about its horizontal or vertical axes and signal the fisherman of the strike.

1 Claim, 3 Drawing Figures

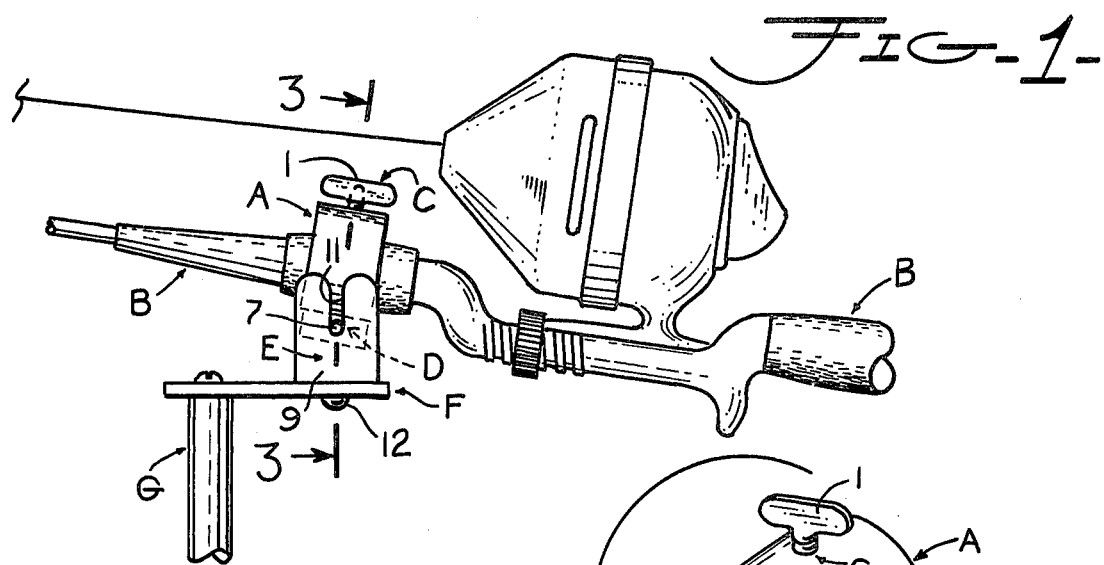
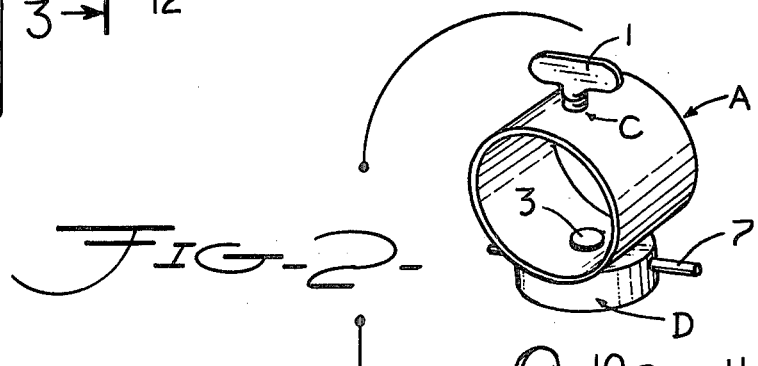
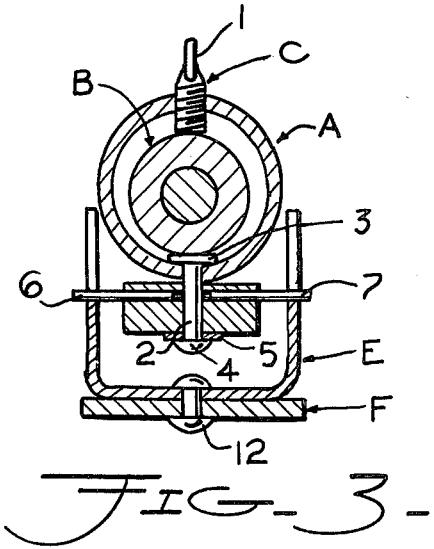
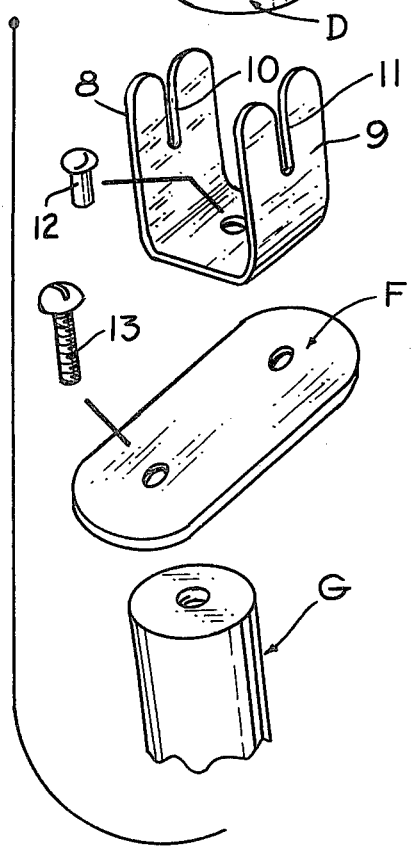

SWIVEL DEVICE FOR SUPPORTING A BALANCED OR SEMI-BALANCED FISHING ROD AND INDICATING WHEN A FISH STRIKES

SUMMARY OF THE INVENTION

Many persons like to fish but they do not wish to be forced to hold a fishing rod while waiting for a fish to strike at the bait. My device has a clevis to pivotally support a fishing rod at its approximate center of gravity so that the rod will be correctly balanced and free to swing about a horizontal or vertical axis without the necessity for the fisherman to hold the rod in his hand. The rod is free to swing about a horizontal or vertical axis in the clevis when a fish strikes the baited hook and is caught. The clevis is swivelly supported by any desired type of support and is free to rotate about a vertical axis and this permits the rod to swing to the right or left when a caught fish starts to swim away and causes the fish line to pull laterally on the free end of the rod.

BRIEF DESCRIPTION OF THE DRAWING

FIG. 1 is a side elevation of my device showing it supporting a standard fishing rod and reel, care being taken that the rod is supported at its center or near its center of gravity so that the rod will be supported in neutral or near neutral equilibrium according to the preference of the fisherman;

FIG. 2 is an exploded isometric view of the various parts making up the device; and FIG. 3 is an enlarged transverse section taken along the line 3—3 of FIG. 1.

DESCRIPTION OF THE PREFERRED EMBODIMENT

In carrying out my invention I provide a clamp A for supporting a fishing rod B. The clamp may be of any type desired, and I have found that a cylindrical clamp A, see FIG. 2, which can be slipped over a fishing rod B, as shown in FIGS. 1 and 3, is the best type to use because it is less likely to become lost. A set screw C with a wing-shaped head 1, has its threaded shank received in a threaded opening provided in the cylindrical clamp A. The clamp is moved along the standard fishing rod B, until the center or near the center of gravity of the rod is located at which point the set screw C, can be tightened to secure the clamp to the rod so as to support the rod in a neutral or near neutral equilibrium. This is very important as will be explained later.

The cylindrical clamp A is permanently and rotatably connected to a trunnion bearing, indicated generally at D, in FIGS. 2 and 3. The trunnion bearing comprises a disc-shaped body with a rivet extending axially therethrough, the rivet extending through the wall of the cylindrical clamp A, and being axially aligned with the axis of the set screw C. The upper rivet head 3 contacts with the adjacent surface of the fishing rod B, and this permits the rod to be securely clamped between the rivet head 3 and the set screw C when the latter is tightened to secure the clamp to the rod while at the same time not interfering with the free rotating action of the clamp A about the axis of the rivet as a pivot. This is due to the fact that the length of the rivet 2 between its heads 3 and 4 is sufficient to receive the thickness of the cylindrical clamp wall A, the thickness of the body of the disc D, and that of the washer 5 without placing any binding action between adjacent parts. This will permit the clamp A to freely swivel about the axis of the rivet 2 even when the fishing rod B, is secured firmly in place in the clamp A by the set screw C.

The trunnion bearing D has a pair of diammetrically extending trunnions 6 and 7, see FIG. 3, projecting from the periphery of the disc-shaped body and these trunnions lie in a plane that is normal to the axis of the rivet 2. Referring to FIG. 2, it will be seen that I provide a clevis E which is U-shaped and the upstanding sides 8 and 9 of the clevis parallel each other and have vertically extending slots 10 and 11 therein, respectively. The two slots 10 and 11 will removably receive the two trunnions 6 and 7 of the trunnion bearing D. The two slots have a length which will rockably support the trunnions and hold them in a plane which is normal to the vertical axis of the rivet 2.

It will be seen from this construction that the stnadard fishing pole B, properly balanced or nearly balanced by the clamp A can have the trunnions 6 and 7 of its trunnion bearing D, dropped into the slots 10 and 11, whereby the balanced or nearly balanced fishing pole B, is free to swing in a vertical plane normal to the axis of the trunnions and the pole B and the clamp A are also free to swing laterally about the vertical axis of the rivet 2 as a center.

The clevis E, may be attached to any type of desired support. I have illustrated in the drawing a supporting base F to which the clevis is secured by a rivet 12 or other suitable fastening means. The base F, in turn, may be mounted on a supporting member such as a pole G by a screw 13. The pole G may be driven into the ground near a body of water where the fisherman desires to catch fish.

The base F, and the pole G, are shown as only one example for supporting the clevis E, the trunnion bearing D, and the clamp A. The vital parts of my invention are the clevis E, the trunnion bearing D and the clamp A. The clevis E and its supporting base F, could be secured to other types of support such as a metal rod, a broom stick or even a limb of a tree. It is obvious also that the base F could be secured to the edge of a pier or to the back of a boat by any suitable fastening means. For this reason, I do not wish to be confined only to the supporting pole G for the base A. The base F, and the pole G, are optional. The clevis E could be attached to any type of support.

The particular place at which the fisherman secures the clamp A to the fishing rod B, depends on the wishes of the fisherman. He may have a preference of his own as to where the clamp A is to be secured to the rod B. If the clamp A is secured to the pole B, at the center of gravity of the pole, the pole will maintain a horizontal position when the clamp and trunnion bearing D, are mounted for free swinging in the clevis E. If the clamp A, is positioned on the pole just forward of the center of gravity for the pole, the length of the rod will remain in an upwardly inclined position when mounted in the clevis and this is the normal position of the rod when a fisherman holds the rod himself. Then when a fish strikes and is caught, the tip of the rod will swing downwardly due to the fish pulling on the fish line and this will signal the fisherman to remove the pole from the clevis E, and "play" the fish in the customary manner.

It should be noted that when the trunnions 6 and 7 are dropped into the vertical slots 10 and 11 for supporting the clamp A and fishing rod B, an automatic lock between the trunnions and clevis, E, is formed. By that I mean, when a fish strikes the bait, is caught and starts to swim away, the fish cannot accidentally pull the trunnions 6 and 7 out of their cooperating slots 10 and 11, because the pull on the fishing line will be in a downward direction and this will hold the trunnions in the slot bottoms. However, the slots 10 and 11 permit the fisherman to grasp the pole B, and remove the clamp A and trunnions from the slots by merely lifting the rod.

This "locking arrangement" between the trunnions and slots permits my device to be supported at the back of a boat while the fisherman is trolling his line behind the boat. When a fish strikes the baited hook and starts to swim away, it is impossible for the fish to pull the trunnions 6 and 7 out of the slots 10 and 11 in the clevis E, and yet the fisherman can easily lift the fishing rod and clamp A, out of the clevis E.

I claim:

1. A swivel device for supporting a fishing rod at or near the center of gravity of the rod and in which the rod is free to swing about a vertical and horizontal axis and can be freely lifted in a vertical direction off from the swivel device and comprising:
   (a) a clevis shaped support having vertically extending and spaced apart side walls integral with a web portion of the clevis, the planes of the side walls paralleling each other and each side wall having a vertical slot extending downwardly from its upper edge, the bottom of each slot lying in the same horizontal plane;
   (b) a trunnion bearing having a base with diammetrically extending trunnions projecting beyond said base and rockably receivable in said slots so that when the trunnions are supported by the bottoms of said slots, the aligned axes of said trunnions will lie in said horizontal plane;
   (c) a fishing pole clamping member permanently and pivotally connected to the top of the base member of said trunnion bearing and freely swingable about said pivotal connection, the axis of said pivotal connection being normal to and intersecting the common axis of said trunnions; and
   (d) whereby said clamping member is free to swing about the pivotal connection between the clamping member and the trunnion bearing base as the fishing pole may be swung laterally, said trunnion bearing base being free to swing about the common axis of said trunnions to permit the fishing pole to likewise freely swing in a plane normal to said same horizontal plane, and the pole and said clamping member with its attached trunnion bearing beikng moved when a fish strikes to attract the fisherman, and permitting him to grasp the pole and freely lift it in a vertical direction to free the trunnions from the slots in said clevis side walls so that the fisherman can play the fish immediately and capture it.

* * * * *